United States Patent

Sugaya

Patent Number: 5,754,192
Date of Patent: May 19, 1998

[54] IMAGE RECORDING APPARATUS

[75] Inventor: Akio Sugaya, Yokohama, Japan

[73] Assignee: Canon Kabushiki Kaisha, Tokyo, Japan

[21] Appl. No.: 433,194

[22] Filed: May 2, 1995

Related U.S. Application Data

[63] Continuation of Ser. No. 916,614, Jul. 22, 1992, abandoned.

[30] Foreign Application Priority Data

Jul. 30, 1991 [JP] Japan ................................ 3-189760

[51] Int. Cl.$^6$ .................................................. G06K 15/00
[52] U.S. Cl. .......................... 346/33 R; 347/5; 347/15; 358/523; 358/404
[58] Field of Search .................... 346/33 R; 395/114, 395/115, 116, 102; 358/523, 525, 404; 347/5, 247, 14, 15

[56] References Cited

U.S. PATENT DOCUMENTS

| | | | |
|---|---|---|---|
| 4,196,450 | 4/1980 | Miller et al. | 358/256 |
| 4,517,578 | 5/1985 | Tazaki | 346/140 R |
| 4,811,249 | 3/1989 | Marsh | 364/550 |
| 5,068,805 | 11/1991 | Tsuzuki | 395/164 |
| 5,199,101 | 3/1993 | Cusick et al. | 395/115 |
| 5,208,676 | 5/1993 | Inui | 358/296 |
| 5,208,902 | 5/1993 | Kumon | 395/116 |
| 5,285,290 | 2/1994 | Sakai et al. | 358/404 |

FOREIGN PATENT DOCUMENTS

| | | | |
|---|---|---|---|
| 354791 | 2/1990 | European Pat. Off. | G06K 15/00 |
| 3899298 | 9/1990 | European Pat. Off. | H04N 1/40 |
| 402074 | 12/1990 | European Pat. Off. | G06K 15/02 |
| 436026 | 7/1991 | European Pat. Off. | B14J 3/12 |
| 3931128 | 3/1990 | Germany | G06F 15/66 |
| 2224187 | 4/1990 | United Kingdom | G06F 15/66 |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

An image recording apparatus compares the memory size for storing image data corresponding to an image to be recorded with a recording sheet size designated by a recording sheet size designation command included in printing data output from an external apparatus. If the recording sheet size exceeds the memory size, the apparatus forms image data in a resolution lower than a normal resolution and stores the data in the memory. On printing the image in accordance with the stored image data, the apparatus multiplies the data in the memory and records the image in the initial resolution.

20 Claims, 11 Drawing Sheets

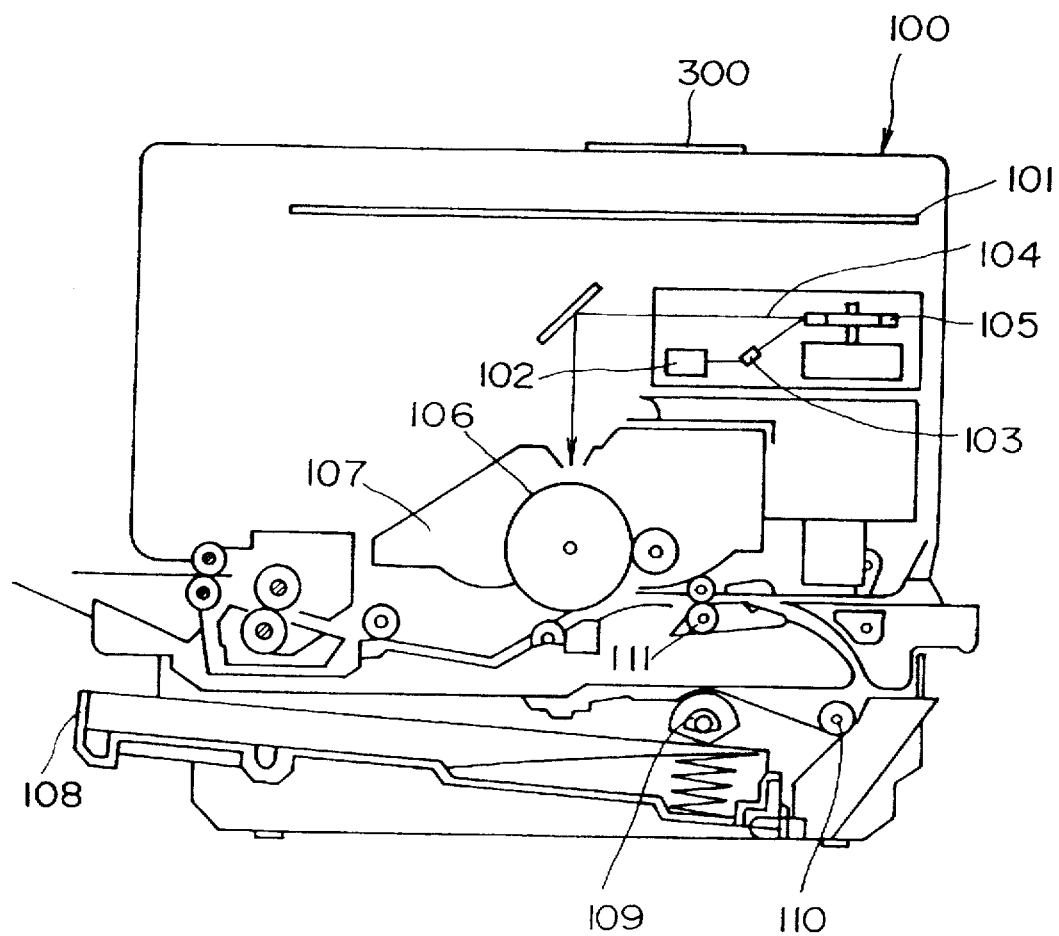
F I G. 8

IMAGE RECORDING APPARATUS

This application is a continuation of application Ser. No. 07/916,614 filed Jul. 22, 1992, now abandoned.

BACKGROUND OF THE INVENTION

The present invention relates to an image recording apparatus, and more particularly, to an image recording apparatus which records a visible image on a recording medium in accordance with input printing data.

Generally, when a host computer outputs printing data to a printer, the printing data includes command data to designate the size of the recording sheets.

The printer stores dot image data based on the input printing data stored in a memory. The printer reads the image data out of the memory sequentially and outputs the data to a recording device. This processing requires the memory to store at least image data corresponding to an image to be recorded by one printing motion of the recording device. At this time, the number of dots of the image data should coincide with that of the image to be recorded.

Recently, printing apparatus having a resolution of 300 dpi (300 dots per inch) is generally used. This type of apparatus should be equipped with a memory having about 900 kilobyte (KB) capacity (for an A4-sized sheet). In a printer capable of printing an A3-sized image, the capacity of the memory should be doubled to 1.8 megabyte (MB).

Further, a high resolution printing apparatus capable of outputting an A4 sized image with 600 dpi resolution requires a quadruple capacity of 3.6 MB.

In this manner, the higher the resolution becomes the larger the required memory capacity becomes, resulting in large-sized apparatus, and increased cost of manufacture.

SUMMARY OF THE INVENTION

The present invention has been made in consideration of the above conventional apparatuses, and has as its object to provide an image recording apparatus capable of recording an image on a predetermined recording medium even if the amount of printing data of the image exceeds the memory capacity for storing the image data.

According to the present invention, the foregoing object is attained by providing an image recording apparatus for recording image data based on provided input printing data in a predetermined resolution on a predetermined recording medium, an image recording apparatus for recording an image based upon input printing data in a predetermined resolution on a predetermined recording medium, comprises memory means for storing image data corresponding to the image to be recorded, determination means for determining whether the memory means can store the image data in the predetermined resolution by comparing the image data and the memory capacity of the memory means, storage means for, when the determination means determines that the memory means cannot store the image data, forming image data in a resolution lower than the predetermined resolution and storing the image data in the lower resolution in said memory means, and forming means for forming image data in the predetermined resolution by interpolating the image data in the lower resolution.

It is another object of the present invention to provide an image recording apparatus for, even when the amount of received input printing data exceeds the memory capacity for storing the data, at least recording an image according to the input printing data on a predetermined recording medium.

According to the present invention, the foregoing object is attained by providing an image recording apparatus for recording the image based on provided input printing data in a predetermined resolution on a predetermined recording medium, comprises recording means for recording the image line by line, memory means for storing the image data corresponding to an image to be recorded, determination means for determining whether the memory means can store the image data in the predetermined resolution by comparing the image data with the memory capacity of the memory means, storage means for, when the determination means determines that the memory means cannot store the image data, forming image data in a resolution lower than the predetermined resolution and storing the image data in the lower resolution in the memory means, and forming means for forming image data in the predetermined resolution by interpolating the image data in the lower resolution, wherein the recording means records the image in accordance with the image data formed by the forming means.

It is still another object of the present invention to provide an image recording apparatus which, even when an area for storing recording image data based on designated printing data cannot be secured, at least records an image in an image size designated by the printing data.

According to the present invention, the foregoing object is attained by providing an image recording apparatus for recording an image based upon provided input printing data in a predetermined resolution on a predetermined recording medium, comprises recording means for recording an image line by line, a memory used by a microprocessor which controls the apparatus during printing processing, determination means for determining whether the memory can store the image data in the predetermined resolution by comparing the image data with the memory capacity of the memory, storage means for, when the determination means determines that the memory cannot store the image data, forming image data in a resolution lower than the predetermined resolution and storing the image data in the lower resolution in the memory, and forming means for forming image data in the predetermined resolution by interpolating the image data in the lower resolution stored by the storage means, wherein the recording means records an image in accordance with the image data formed by the forming means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a cross-sectional view of a laser-beam printer in the embodiment;

DETAILED DESCRIPTION OF THE PREFERRED EMBODIMENTS

Figure 1:
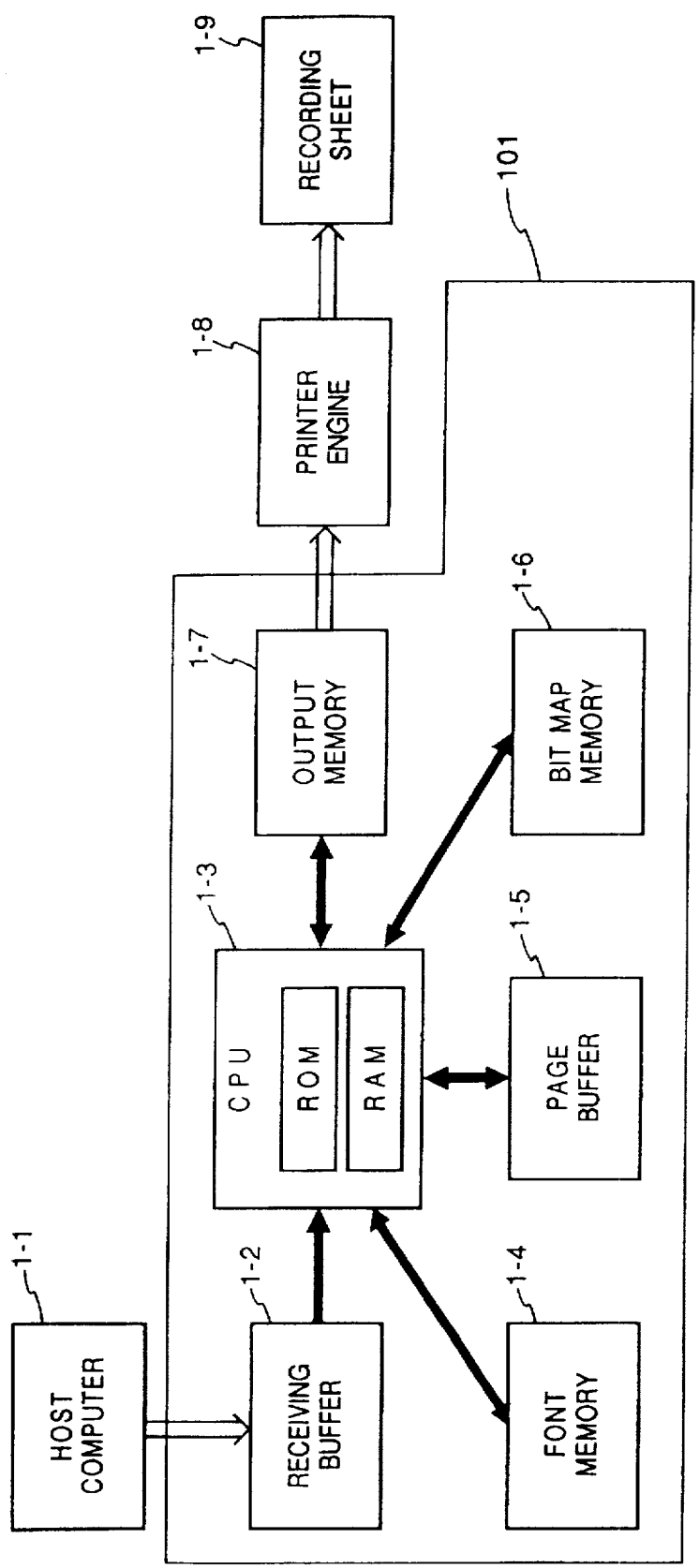
FIG. 1 is a block diagram of a printer according to an embodiment of the present invention.

Preferred embodiments of the present invention will be described in detail in accordance with the accompanying drawings.

[First Embodiment]

FIG. 8 is a cross-sectional view showing the inside structure of a laser-beam printer (hereinafter abbreviated to LBP) applied to an embodiment of the present invention. This LBP can register character pattern data and form data from a data generating source (not shown) and can print images in 600 dpi resolution.

In FIG. 8, a LBP main body 100 stores information such as character information (character code information), form information and a macro instruction from a host computer (data generating source) connected to an external device. The LBP main body 100 forms corresponding character patterns and form patterns in accordance with the input information, and forms an image on a recording medium such as a recording sheet. Numeral 300 denotes a control panel on which various operating switches and a LED (light emitting diode) display and the like are arranged. A printer control unit 101 controls the overall LBP 100 and analyzes information such as character information supplied from the host computer. Further, the printer control unit 101 mainly converts character information corresponding to a character pattern into a video signal and outputs a signal to a laser driver 102.

The laser driver 102 is a circuit for driving a semiconductor laser unit 103. The laser driver 102 generates a laser beam 104 by driving the semiconductor laser unit 103. A polygon mirror 105 rotating at a constant speed reflects the laser beam 104 with one of its side faces so that the laser beam 104 scans and exposes an electrostatic drum 106 by being swept back and forth along a perpendicular direction to a conveying direction of a recording sheet. An electrostatic latent image such as a character pattern is formed on the electrostatic drum 106. A developing unit 107 arranged around the electrostatic drum 106 develops the latent image and transfer the image onto a recording sheet. The recording sheet is a cut-sheet type recording sheet set in a cassette 108 attached to the LBP 100. A paper feeding roller 109, document feeding rollers 110 and 111 convey the sheet into the LBP 100 and supply the sheet to the electrostatic drum 106.

FIG. 1 is a block diagram of the printer control unit 101 which mainly controls the overall LBP main body 100. In FIG. 1, a host computer 1-1 inputs printing data to the control unit 101. A receiving buffer 1-2 stores the input printing data. A CPU 1-3 for controlling the LBP 100 incorporates a ROM which stores programs necessary for image recording including a processing procedures program to be described with reference to FIGS. 2, 6 and 7, and a RAM used as a work area. A font memory 1-4 stores font patterns and a page buffer 1-5 stores page information based on received data. Output image data for one page are stored in a bit map memory (first memory) 1-6, and output to an output memory (second memory) 1-7, where the resolution of the output image data is adjusted to that of a printer engine 1-8. The printer engine 1-8 (FIG. 8) forms an image on a recording medium based on an output video signal from the output memory 1-7. Numeral 1-9 denotes a printed recording sheet.

In the structure as described above, in this embodiment, when the amount of image data to be stored in the bit map memory 1-6 is insufficient for the resolution of the printer engine 1-8, the data in the bit map memory 1-6 are doubled and stored in the output memory 1-7 so that the resolution of the data in the output memory 1-7 is adjusted to that of the printer engine 1-8. It should be assumed that the original recording sheet size of the printing apparatus of this embodiment is defined as "size one", and the recording sheet size of an image to be printed is "size two", which is larger than the "size one". Conventionally, the image in the "size two" cannot be printed without installing additional memory board(s), however, this embodiment enables the printing in the "size two" without any additional memory board(s).

Figure 2:
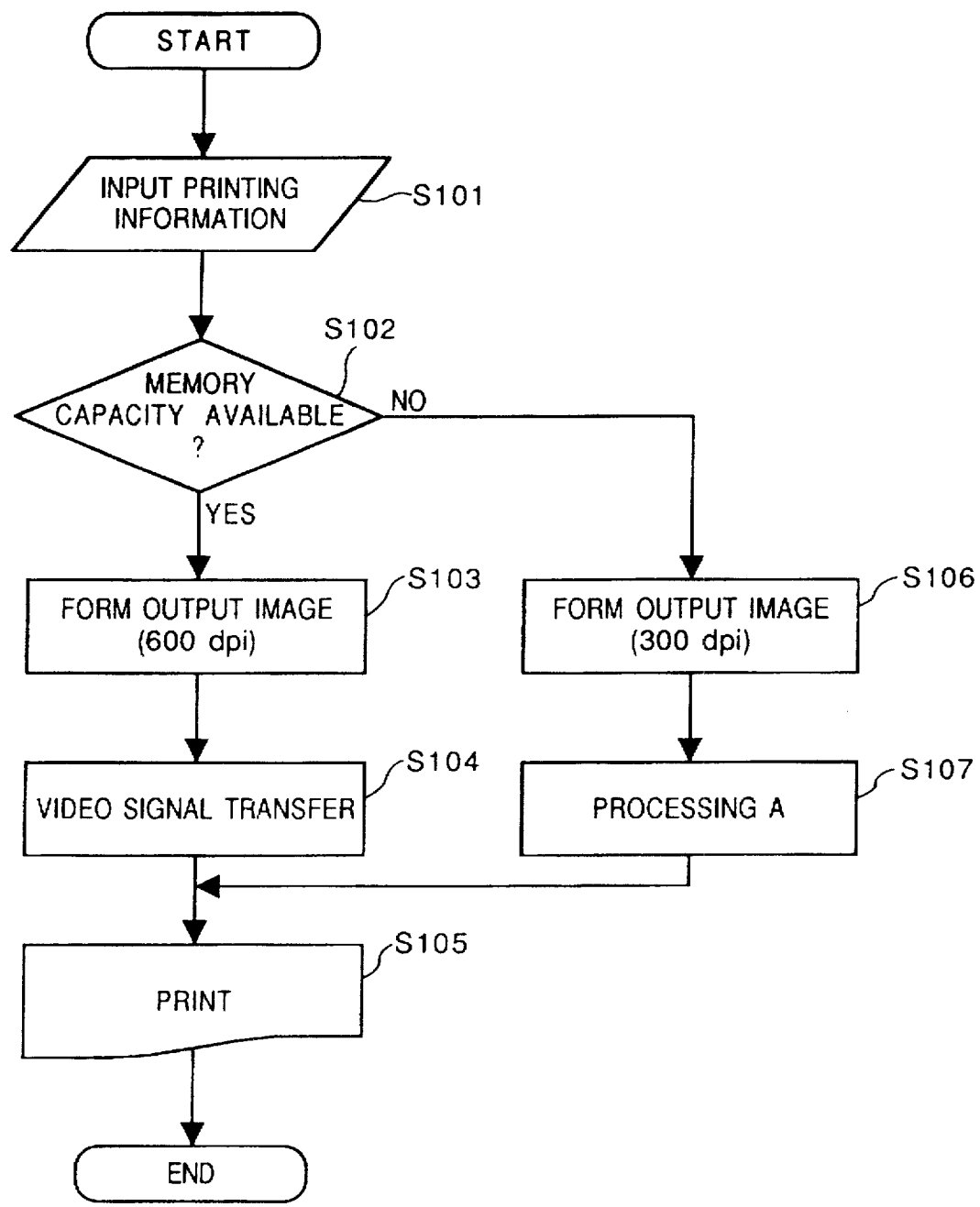
FIG. 2 is a flowchart showing an outline of a printing processing in the embodiment.

The overall operation of the printing apparatus of this embodiment will be described with reference to the flowchart of FIG. 2. Note that this embodiment is based on the premise that the printer engine 1-8 has 600 dpi resolution, and the page buffer 1-5 already stores printing data for one page.

First, in step S101, the printing data are read out of the page buffer 1-5, then in step S102, whether or not the bit map memory 1-6 can secure a memory capacity for 600 dpi resolution (about 3.6 MB for A-4 sized sheet) is determined. This determination is made by examining a recording sheet designation command included in the printing data. If the memory capacity is sufficient, in step S103, output image data are formed in the bit map memory 1-6 in accordance with input image drawing information, adjusting the resolution of the output image data to that of output resolution (600 dpi). Thereafter, in step S104, data for several lines which are stored in the bit map memory 1-6 are transferred to the output memory 1-7, at the same time, the content of the output memory 1-7 is converted into a video signal and transferred to the printer engine 1-8 which prints images on the recording sheet 1-9.

On the other hand, if it is determined in step S102 that the memory capacity of the bit map memory 1-6 is insufficient, i.e., it is determined that the bit map memory 1-6 cannot secure a bit map memory for 600 dpi resolution, the process proceeds to step S106, where a bit map memory for 300 dpi resolution (about 900 KB) is secured and output image data for 300 dpi resolution are formed. This is followed by step S107 for performing a processing A to be described below.

Figure 3:
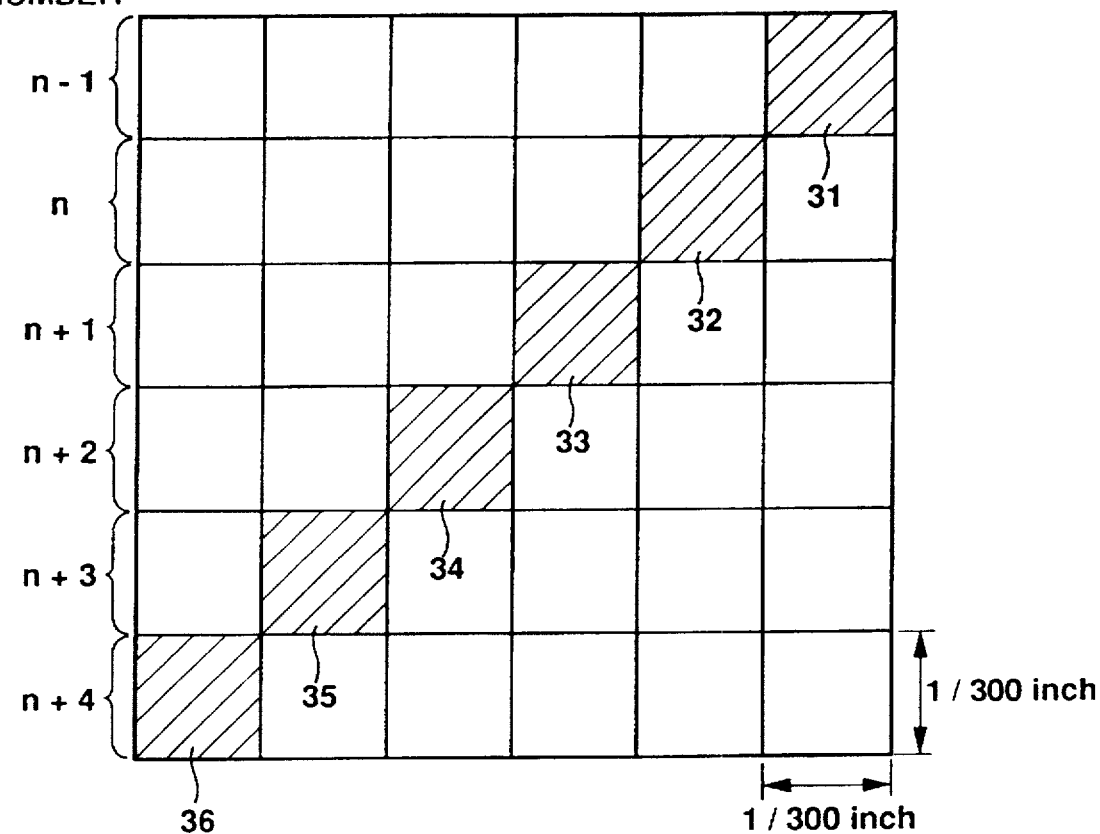
FIG. 3 is a diagram showing an example of an image in a bit map memory in the embodiment.

FIG. 3 shows an example of image data in 300 dpi resolution stored in the bit map memory 1-6 in step S106. The size of each cell is $\frac{1}{300} \times \frac{1}{300}$ inch to represent one dot in the 300 dpi resolution data. Numerals 31 to 36 represent dots in "on" bit statuses.

Figure 4:
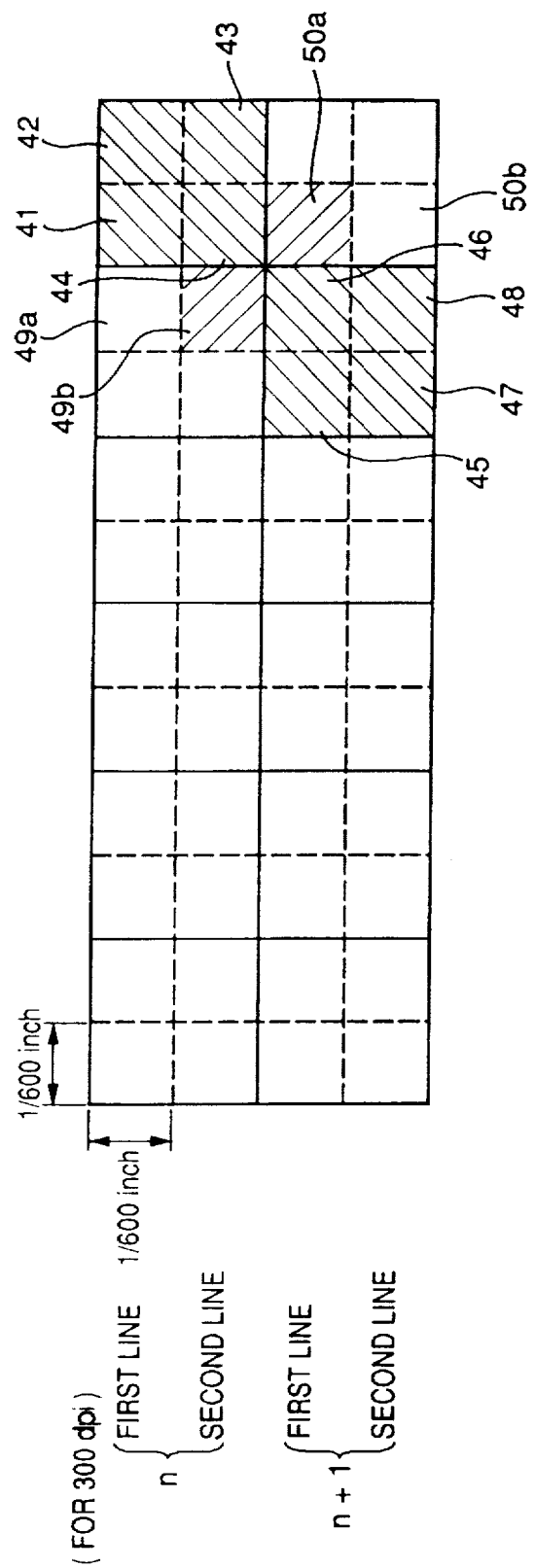
FIG. 4 illustrates an image as a correction processing result in the embodiment.

In this embodiment, the 300 dpi pixel data shown in FIG. 3 are converted into 600 dpi pixel data as shown in FIG. 4.

As shown in FIG. 4, data for two lines in the 600 dpi resolution are equivalent to data for one line in the 300 dpi resolution. In other words, the same line of data is read out of the bit map memory 1-6 twice to form a first line and a second line in the 600 dpi resolution to be output to the printer engine 1-8.

A more detailed explanation is as follows.

First, in the first output processing of line data of the 600 dpi data (the first line data), the output memory 1-7 stores the line data in the 300 dpi resolution data to be output. Note that the pixel data read out of the bit map memory 1-6 are in 300 dpi resolution and the number of pixels of the data should be reduced to be half in 600 dpi resolution if they are written into the output memory 1-7 as they are. For this reason, a read-out address for the bit map memory 1-6 is controlled to be incremented by one at every second read-out operation. Otherwise, data for one pixel read out of the bit map memory 1-6 may be converted into data for two pixels before the data are written into the output memory 1-7. This doubling processing with respect to a main scanning direction is performed by software, however, if the processing is simple, it can be performed using hardware.

As described above, the pixel number for 600 dpi printing can be prepared. Further, the CPU 1-3 examines the status of lines of the data in the bit map memory 1-6 corresponding to the data written into the output memory 1-7, and performs correction (interpolation) to the pixel data.

Thus, by outputting the corrected data to the printer engine 1-8, the first line data in the 600 dpi resolution are recorded.

Next, a second processing (second line data) is followed, where line data in 300 dpi resolution are processed in the above manner and stored in the output memory 1-7. Also the data in the memory 1-7 is interpolated and output to the printer engine 1-8.

FIG. 4 illustrates the result of the correction processing. Pixels 41 to 48 represent black pixels in 600 dpi ("on" bit statuses) formed by simply doubling the 300 dpi data. Pixels 49b and 50a are corrected black pixels which were initially white ("off" bit status). Pixels 49a and 50b are maintained as white.

In the correction processing, whether a current processing is toward a first line of the 600 dpi data corresponding to an object 300 dpi line data or toward a second line of the 600 dpi data also corresponding to the object 300 dpi line is determined. Thereafter, whether the status of the object 600 dpi pixel data should be changed to "on" or not is determined based upon previous line data and next line data of the object 300 dpi line data.

This correction processing will be described in detail with reference to FIGS. 5A to 5D respectively, showing four types of the correction.

Figure 5A:
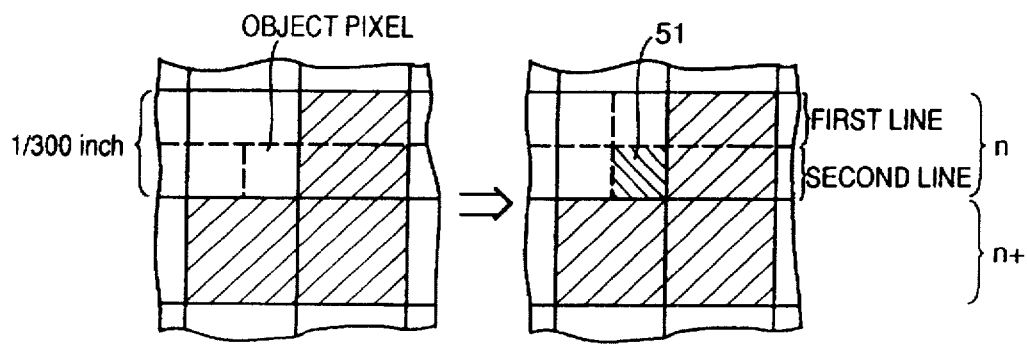
FIGS. 5A to 5D are diagrams for explaining the correction processing in the embodiment.

In FIG. 5A, if an object 600 dpi pixel (51) is positioned in the second line in 600 dpi output processing and made white by simple doubling processing, further, the next pixel and the pixel in the next line are both black, the object pixel is corrected to be black.

Figure 5B:
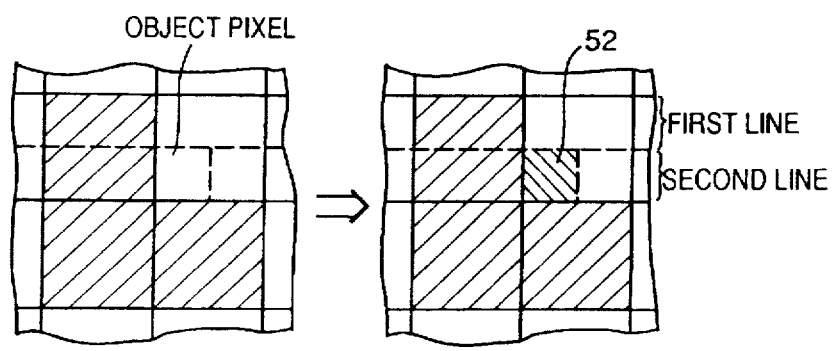

In FIG. 5B, if an object 600 dpi pixel (52) is positioned in the second line in the 600 dpi output processing and the previous pixel and the pixel in the next line are both black, the object pixel is corrected to be black.

Figure 5C:
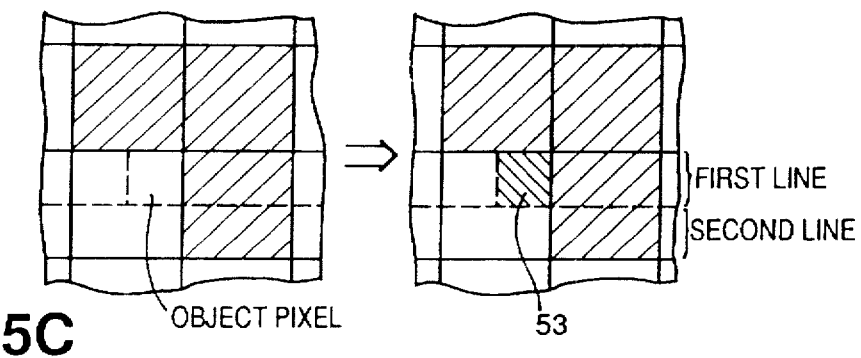

In FIG. 5C, if an object 600 dpi pixel (53) is in the first line in the 600 dpi output processing and the next pixel and the pixel in the previous line are both black, the object pixel is corrected to be black.

Figure 5D:
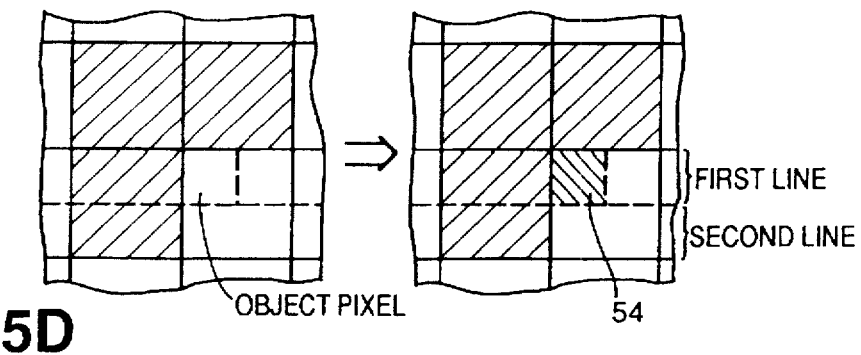

In FIG. 5D, if an object pixel (54) is in the first line in the 600 dpi output processing and the previous pixel and the pixel in the previous line are both black, the object pixel is corrected to be black.

In the above processing, when an object 600 dpi pixel stored in the output memory 1-7 is white and the neighboring pixel is black, whether the object pixel should be corrected to be black or maintained white is determined. If the above conditions are satisfied, the object pixel is corrected to be black.

Figure 6:
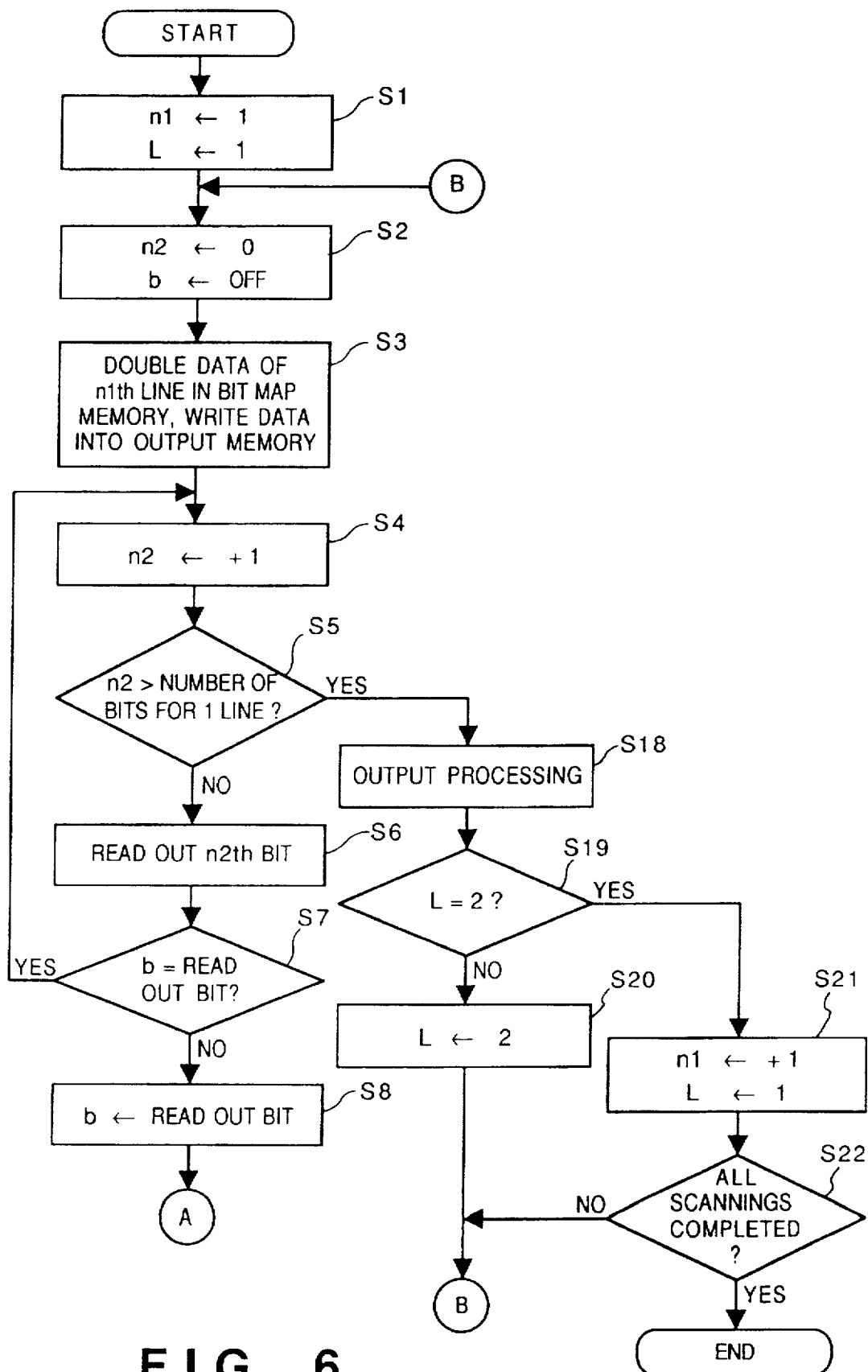
FIGS. 6 and 7 are flowcharts showing in detail step S7 of FIG. 2.
Figure 7:
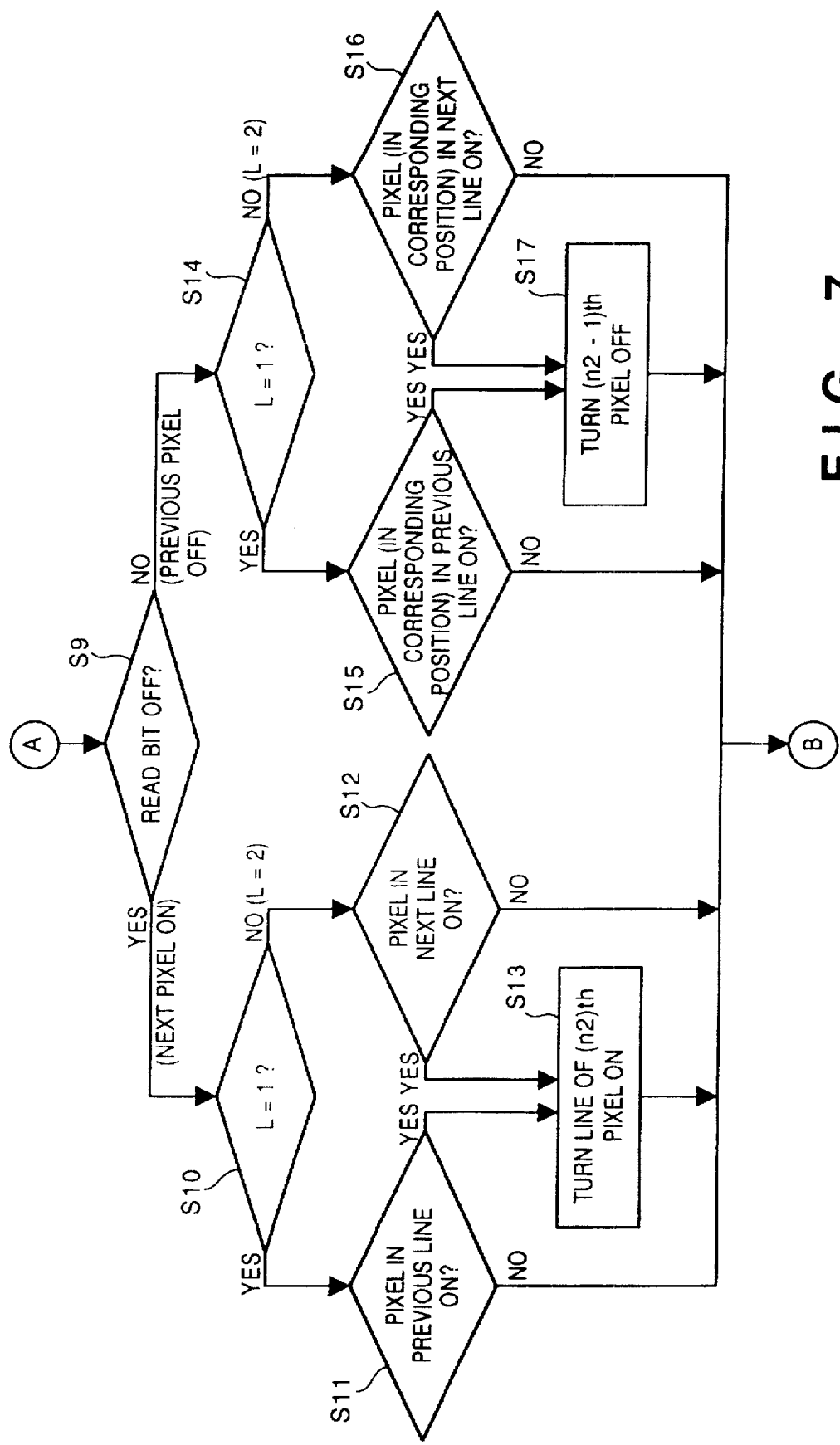

Detailed explanation of the correction processing will be made with reference to the flowcharts of FIGS. 6 and 7. Note that variables $n_1$, $n_2$, b and L are secured in the RAM in the CPU 1-3 in advance. The variable $n_1$ is indicative of a line number of the 300 dpi data to be read in the bit map memory 1-6; the variable $n_2$, a pixel position of uncorrected 600 dpi data stored in the output memory 1-7; the variable b, a status of the previous pixel in the output memory 1-7; and the variable L, a value showing whether a 600 dpi line being currently corrected is the first line or the second line corresponding to a 300 dpi line.

It should be noted that the pixel in the output memory 1-6 indicated by variable $n_2$ corresponds to a $n_2/2$th pixel of the object 300 dpi line in the bit-map memory 1-6 indicated by the variable $n_1$, since the number of pixels in the output memory 1-7 is made by doubling the number of pixels in a 300 dpi line.

First, in step S1, the variable $n_1$ is made "1" to indicate the first line of the 300 dpi data in the bit map memory 1-6, the variable L is made "1" to indicate the first line of 600 dpi data as an object line to be processed. Next, in step S2, the variable $n_2$ is made "0" and the variable b indicative of the status of the above described previous pixel is set to indicate "off" status as an initial stage of the processing. In step S3, a first line data of the 300 dpi data in the bit map memory 1-6 indicated by the variable $n_1$ are doubled along the main scanning direction and written into the output memory 1-7. In step S4, the variable $n_2$ is incremented by "1".

In step S5, the value of the variable $n_2$ is examined to determine whether the processing for one line of the 600 dpi data has been finished. If NO, the process proceeds to step S6, while if YES, the process proceeds to step S18. When the process advances to step S6, a bit, the position of which is indicated by the variable $n_2$, is read out of the output memory 1-7. In step S7, whether the variable b and the status of the read bit coincide is determined, i.e., whether the status of the pixels is changed is determined. If it is not changed, the object pixel is not regarded as an object to be corrected, therefore the process returns to step S4 where the next pixel is read.

If it is determined that the status of the read object pixel is different from that of the previous pixel, the process advances to step S8, where the read bit status is stored in the variable b so that the variable b can be updated. In step S9, the content of the status of the read object pixel is examined to determine whether the bit status of variable b is off or not. If YES, the process proceeds to step S10, while if NO, the process proceeds to step S14.

The off-status of the object pixel means that at least one previous pixel of the object pixel was in on-status, and the status of the object pixel has been changed to off-status. More specifically, the object pixel may be in the status of pixel 52 in FIG. 5B or that of pixel 54 in FIG. 5D. If the object pixel is actually in pixel 52 or 54 status, the bit status should be changed to on-status. The status-change processing is made in step S10 and the subsequent steps.

In step S10, the variable L is examined to detect whether it is "1" or not, i.e., whether the processing currently being performed is to the first line or the second line of the 600 dpi data. In case L=1, the process proceeds to step S11, where the status of a pixel at a position corresponding to the object pixel position in the previous line in the 300 dpi data in the bit map memory 1-6 is examined. More specifically, whether the status of the $n_2/2$th pixel in the $n_1-1$th line, i.e., the previous line of the object line is "on" or "off" is examined. If it is on-status, the status of the object pixel coincides with that of pixel 54 in FIG. 5D. Accordingly, in step S13, the pixel at the position indicated by the variable $n_2$ in the output memory 1-7 is changed to "on". The process returns to step S2. Further, if the decision in step S11 is "NO", the object pixel is kept white, then the process returns to step S2.

If "NO" in step S10 (the processing is for the second line in the 600 dpi data), the status of a pixel $n_2/2$ in the next line in the bit map memory 1-6 is examined. If it is on-status, the status of the object pixel corresponds to that of pixel 52 in FIG. 5B. Accordingly, the status of the pixel $n_2$th in the 600 dpi data in the output memory 1-7 is changed to "on", and the process returns to step S2. If the decision in step S12 is "NO", the object pixel is keep white and the process returns to step S2.

On the other hand, in step S9, if it is determined that the status of the object pixel is "on", it means that at least one previous pixel of the object pixel was in off-status and the object pixel has been changed to on-status. More specifically, the status of the previous pixel of the object pixel is may be the status of pixel 51 in FIG. 5A or that of pixel 53 in FIG. 5C. If the previous pixel is actually in pixel 51 or 53 status, the bit status should be changed to on-status. The status-change processing is performed in step S14 and the subsequent steps.

In step S14, the variable L is examined to detect whether it is "1" or not, i.e., whether the processing currently being performed is to the first line of the 600 dpi data or not. In case L=1, the process proceeds to step S15, where the status of a pixel at a previous pixel position $(n_2-1)/2$ of the object pixel position in the previous line is "on" is determined. More specifically, whether the status of the $n_2/2$th pixel in the $n_1-1$th line in the bit map memory 1-6 is "on" or "off" is examined. If YES, the status of the previous pixel of the object pixel coincides with that of pixel 53 in FIG. 5C. Accordingly, the previous pixel, i.e., $n_2-1$th pixel in the 600 dpi data in the output memory 1-7 is changed to "on", and the process returns to step S2. Further, if "NO" in step S15, the pixel is kept white and the process returns to step S2.

If "NO" in step S14, i.e., it is detected that the line currently being processed is the second line of the 600 dpi data, the status of a pixel at a previous pixel position $(n_2-1)$ of the object pixel position in the next line is examined. If it is in on-status, the status of the previous pixel of the object pixel coincides with that of pixel 51 in FIG. 5A. Accordingly, the status of the previous pixel $(n_2-1)$ of the object pixel in the 600 dpi data in the output memory 1-7 is changed to "on", and the process returns to step S2.

The correction processing is performed to the pixel(s) in the 600 dpi data in the output memory 1-7 in the above-described manner. When it is determined that the correction processing to one 600 dpi line is completed, the process proceeds to step S18, where the corrected data for one line in the 600 dpi data are output-to the printer engine 1-8.

In step S19, the variable L is examined to detect whether it is "2". If NO, i.e., it is detected that L=1, the variable L is made "2" so that a correction processing to the second line of the 600 dpi data is performed. As the variable $n_1$ is not updated at this time, the same line in the 300 dpi data as the line read for the first line of the 600 dpi data is read out and doubled along the main scanning direction as the second line in the 600 dpi data.

In step S19, if it is determined that L=2, the variable $n_1$ is incremented by "1" in step S21 so that the next line in the 300 dpi data in the bit map memory 1-6 is processed, and at the same time, the variable L is changed to "1" so that the processing to the first line of the 600 dpi data is performed.

In step S22, the variable $n_1$ is examined to determine whether the processing to the all lines have been completed. If NO, the process returns to step S2, the above-described processing is continued to the last line of the data in the bit map memory 1-6, and thereafter, the series of printing processing is completed.

According to this embodiment, even if the recording apparatus receives printing data which requires a memory capacity larger than the original memory capacity, the apparatus can print the received image data while preventing degradation of image quality as much as possible.

For example, when the bit map memory 1-6 has only the capacity for data for an A4 sized recording sheet, the apparatus can print an A3 sized image.

It should be noted that the interpolation (correction) processing is not limited to the above-described processing, and any other methods can be employed.

In this embodiment, image information for one page in lower resolution (300 dpi) is formed before the resolution conversion, however, the unit for the image information is not limited to this page unit. For example, it is also possible to adapt to a printer for printing a whole image by printing a plurality of partial images, such partial images may be called ban image.

Further, though the correction processing is performed after the lower resolution (300 dpi) has been converted into the higher resolution (600 dpi), the processing can be performed while data for one line are transferred, with the lower resolution being converted into the higher resolution.

In this embodiment, the lower resolution image information is formed using the bit map memory, however, the lower resolution information is not limited to the image. Other information such as form information may be formed to be lower resolution information and stored, thereafter, the stored information can be converted to higher resolution data to be output.

[Second Embodiment]

The embodiment described above is premised that the independent bit map memory 1-6 has a memory capacity sufficient to store image data in 600 dpi resolution for A4 sized sheet and that the printing apparatus has received a recording sheet designation command designating A3 size recording sheets. However, the present invention is not limited to the above case. The work area in the CPU, the receiving buffer, the page buffer and the bit map memory can be arranged into one common memory.

Figure 9:
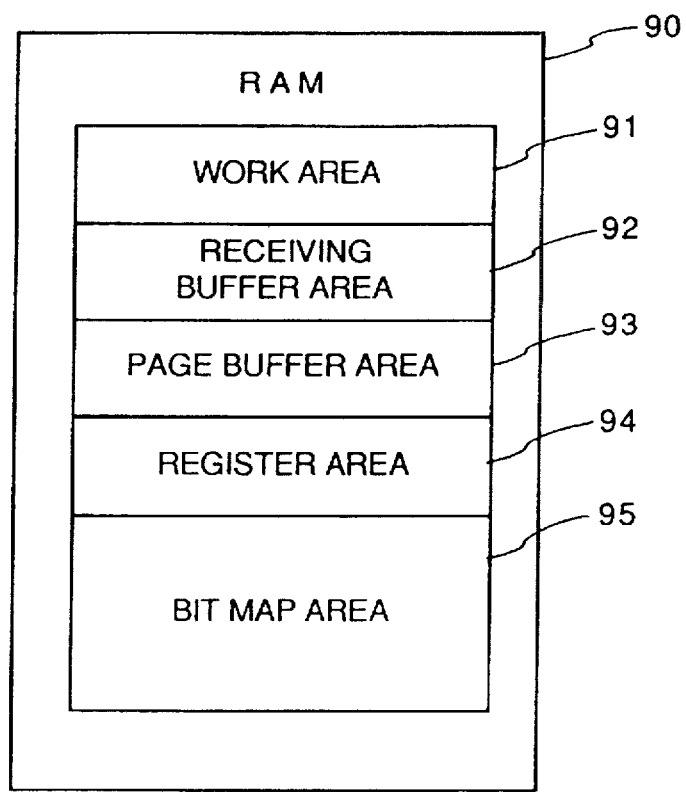
FIG. 9 illustrates an area structure of a RAM according to another embodiment.

FIG. 9 illustrates the administration status of a RAM divided into areas respectively corresponding to the above memories.

In a RAM 90, a work area 91 and a register area 94 correspond to the RAM in the CPU 1-3; a receiving buffer area 92 corresponds to the receiving buffer 1-2; a page buffer area 93 corresponds to the page buffer 1-5; a bit map area 95, the bit map memory 1-6. The register area 94 registers external character data and form data from the host computer 1-1.

In order to register a large amount of information in the register area 94, the area 94 must be large. Since the size of the RAM 90 is limited, the bit map area 95 must be reduced for the extended area of the area 94. Accordingly, if the apparatus capable of recording images on A4 size recording sheets registers too many external character data and form data, it cannot secure a bit map area for data for a A4 sized sheet. In this situation, however, the apparatus can change image data in 300 dpi resolution in the bit map area. Then the data in the bit map area are transferred to the output memory 1-7 line by line, and the doubling processing and the correction processing described above are performed to print an image in 600 dpi resolution.

Note that in the case of the RAM having the memory map as shown in FIG. 9, the size of the bit map area can be calculated by subtracting the last address of the register area 94 from the whole size of the RAM.

Further, when the register area 94 is enlarged, the receiving buffer area 92 can be reduced in place of the bit map area 95. In this case, however, it takes a long time before the host computer 1-1 is released from a printing processing.

As one of factors in the reduction of the bit map area 95, a case where an operator instructs the size of the respective areas via the control panel 300 can be considered. For example, the operator wishes to shorten the time before the host computer is released from the printing processing and may enlarge the receiving buffer area 92.

[Third Embodiment]

The present invention is not limited to a laser-beam printer as in the first and second embodiments, it is applicable also to an ink-jet printer to be described below.

Figure 10:
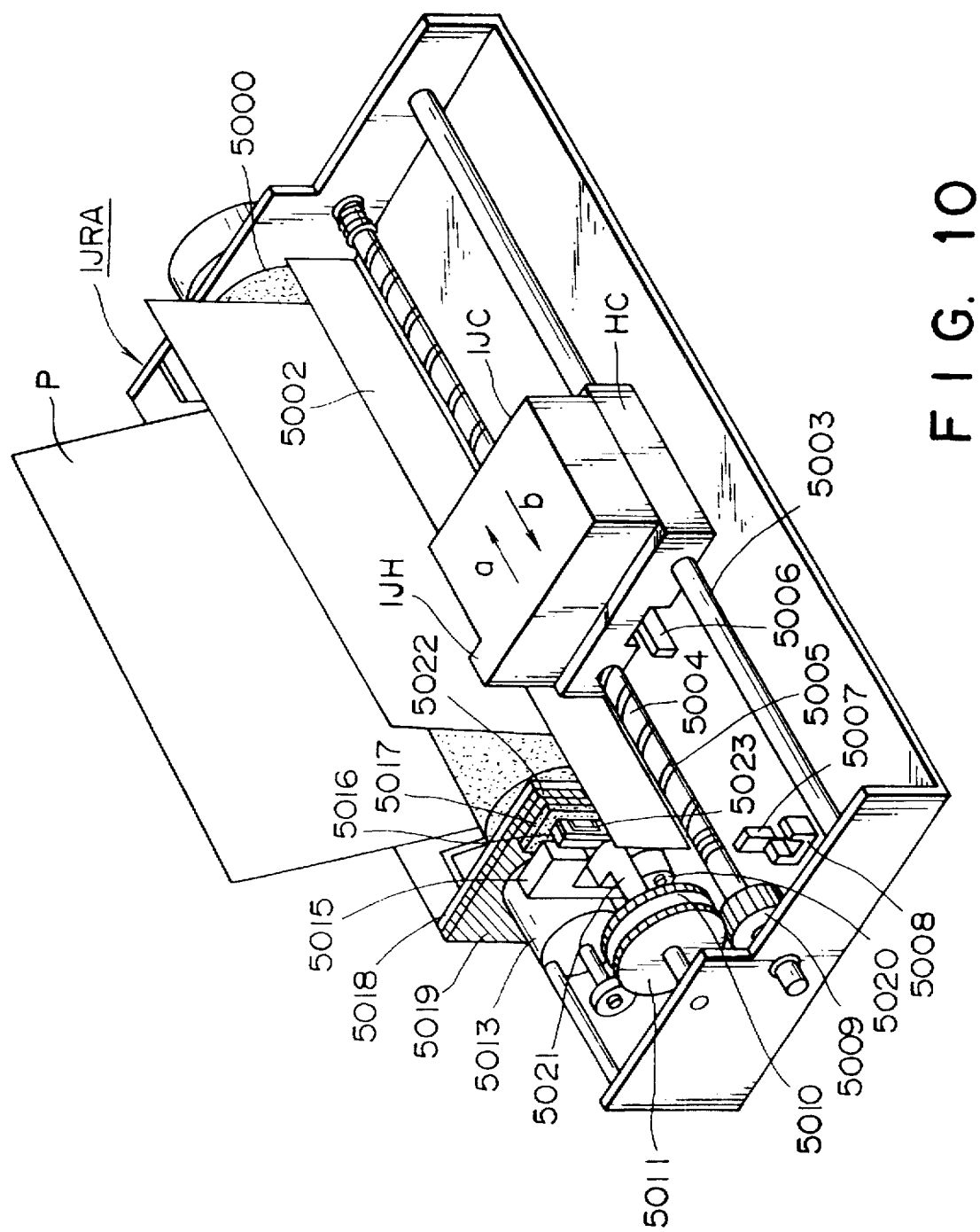
FIG. 10 illustrates the structure of a printing mechanism in another embodiment.

FIG. 10 illustrates an ink-jet recording apparatus IJRA. In FIG. 10, numeral 5013 denotes a driving motor. Numeral 5004 is a lead screw which rotates in an interlocking manner with the forward/reverse rotation of the driving motor 5013 via driving force transmission gears 5011 and 5009. A carriage HC having a pin (not shown) which engages with a spiral groove 5005 of the lead screw 5004 is reciprocally moved toward an arrows a and b directions. An ink-jet cartridge IJC is mounted on the carriage HC. Numeral 5002 denotes a paper holder to press a recording sheet against a platen 5000 along a moving direction of the carriage HC. Numeral 5003 denotes a carriage guide. Photocouplers 5007 and 5008 are home-position detectors for recognizing a lever 5006 of the carriage HC and switching over the rotational direction of the motor 5013. A support member 5016 supports a cap member 5022 to cap the front face of an ink-jet head IJH. A suction member 5015 sucks the recording head IJH in contact with an opening 5023 in the cap member 5022 for preventing choking of the recording head with ink. A cleaning blade driving member 5019 drives a cleaning blade 5017. A main body support plate 5018 supports the cleaning blade 5017 and the cleaning blade driving member 5018. Note that a general cleaning blade can also be applied to this ink-jet printer. Numeral 5021 denotes a lever for starting the suction by the suction member 5015. The lever 5021 moves with the motion of a cam 5020 which engages with the carriage HC. The cam 5020 is driven by a driving force from the driving motor 5013 transmitted by well-known transmission means such as a switching over of a clutch.

When the carriage HC comes to the home position side area, the recording head receives desired processings of the above capping, cleaning and sucking at corresponding positions, led by the lead screw 5005.

Next, the structure of a control circuit for performing recording control of the above-described ink-jet printer will be described with reference to a block diagram of FIG. 11. Note that in the third embodiment, it is premised that the recording head IJH comprises 48 nozzles lined in a vertical direction, and each interval between the respective nozzles is 1/300 inch, which means this ink-jet printer records in a 300 dpi resolution.

Figure 11:
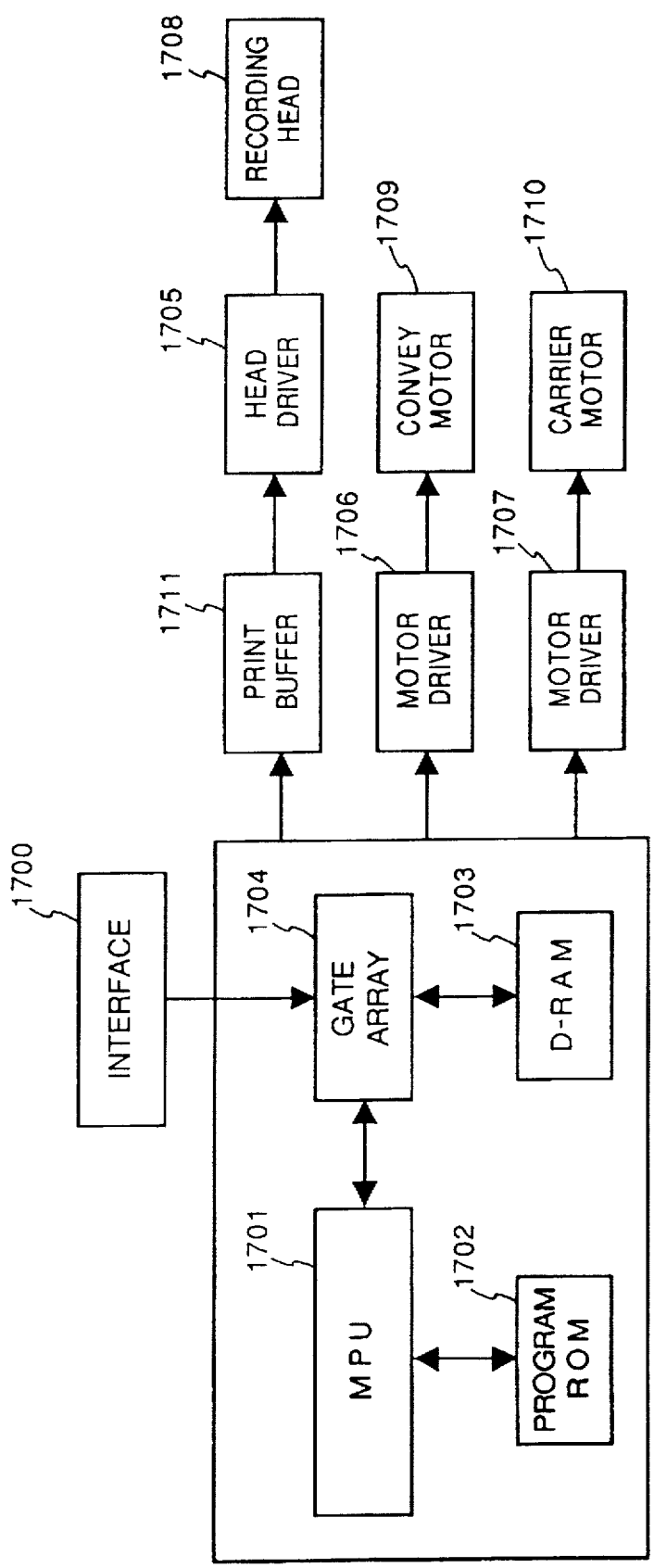
FIG. 11 is a block diagram of a printing apparatus comprising the printing mechanism of FIG. 10.

In FIG. 11, numeral 1700 denotes an interface to which recording signals are input. A MPU 1701 controls the overall printer. A ROM 1702 stores control program(s) executed by the MPU 1701. A D-RAM 1703 is used as a work area of the MPU 1701 and is also used for storing bit map data. A gate array 1704 controls the supply of recording data to a recording head 1708, and controls data transfer among the interface 1700, the MPU 1701 and the RAM 1703. A carrier motor 1710 carries the recording head (IJH) 1708, and a convey motor 1709 conveys a recording sheet. Motor drivers 1706 and 1707 drive the carrier motor 1710 and the convey motor 1709 respectively. A print buffer 1711 stores image data to be recorded by one printing motion of the recording head 1708. A head driver 1705 drives the recording head 1708 in predetermined timing in accordance with image data in the print buffer 1711.

A recording signal entered by the interface 1700 is converted into recording data for printing between the gate array 1704 and the MPU 1701, and is stored in the D-RAM 1703. The image data stored in the D-RAM 1703 are transferred at one printing motion of the recording head 1708.

In the third embodiment, if it is determined that the D-RAM cannot secure a memory having enough capacity for image data to be recorded, the image data are stored in a resolution lower than a normal resolution (150 dpi) in the D-RAM 1703. In the print buffer 1711, image data of 48 dot-width are formed based on the image data of 24 dot-width in 150 dpi resolution stored in the D-RAM 1703. This forming processing of the 48 dot-width image data from the 24 dot-width image data is similar to the conversion process in the first embodiment and therefore the explanation will be omitted.

When the image data for one printing motion of the recording head 1708 are stored in the print buffer 1711, the MPU 1701 drives the motor drivers 1706 and 1707 and controls the head driver 1705 to perform image recording in accordance with the data stored in the print buffer 1711.

As apparent from the third embodiment, the present invention can be applied to an ink-jet printer as described above as well as a laser-beam printer. It goes without saying that the present invention can also be applied to other printers such as a wire-dot printer and a thermal transfer printer. Further, the present invention can be applied to an apparatus capable of recording without reciprocally moving, where a plurality of recording elements respectively having a recording-sheet-width as employed in a facsimile apparatus are arranged on a line, and the apparatus records images without reciprocally moving.

In the first to third embodiments, the employed printers are for monochromatic printing, however, multi-color printers can be employed. In multi-color printing, the aforementioned processings are performed with respect to each color component.

In the embodiments, when it is determined that the memory capacity is not sufficient for storing image data in an original resolution, the image data in half resolution of the original resolution can be stored. However, it is impossible, e.g., to record an A2 size image for a printer having a bit map memory for data for an A4 sized image. In this case, the maximum resolution among storable resolutions is employed based on the memory capacity and the size of the image data as instructed, then image data in the selected resolution are formed. The image data are stored in a ¼ resolution of a normal resolution. The original resolution is resumed on actual printing. As the resolution of the stored image data is ¼ of the original resolution, the image quality of a recorded image is degraded. However, the present invention at least realizes an image having inconspicuous jagged edge portions.

As described above, the present invention enables image recording which prevents degradation of image quality as much as possible even when the amount of received printing data exceeds the memory capacity.

In the embodiments, the smoothing processing is performed after image data for one line are transferred to the output memory 1-7, however, the procedure is not limited to the above. The data for one line can be smoothing-processed before they are transferred to the output memory 1-7.

As many apparently widely different embodiments of the present invention can be made without departing from the spirit and scope thereof, it is to be understood that the invention is not limited to the specific embodiments thereof except as defined in the appended claims.

What is claimed is:

1. An apparatus having a device for outputting image data to printing means for printing an image on a recording medium, comprising:

receiving means for receiving data sent from a data source, the data including print data and designation data for designating a size of a recording medium on which an image is to be printed;

generating means for generating, in accordance with the received print data, image data having one of a plurality of resolutions; and determination means for determining a resolution in accordance with the designation data and an available memory capacity for storing the generated image data, wherein said generating means for generating, in accordance with the received print data, image data having the resolution, which is determined by said determination means.

2. An apparatus according to claim 1, wherein said determination means includes comparison means for comparing a necessary memory capacity necessary for storing the designated size of image data having a first resolution with an available memory capacity for storing the generated image data.

3. An apparatus according to claim 2, wherein, when the necessary capacity is larger than the available capacity, said determination means determines a second resolution smaller than the first resolution as the resolution in which image data is to be generated, and when the necessary capacity is not larger than the available capacity, said determination means determines the first resolution as the resolution in which image data is to be generated.

4. An apparatus according to claim 2, further comprising printing means for printing an image at the first resolution.

5. An apparatus according to claim 4, wherein said printing means comprises one of an electrophotographic printer and an ink jet printer.

6. An apparatus according to one of claim 2, further comprising means for interpolating the generated image data when the resolution of the generated image data is smaller than the first resolution.

7. An apparatus according to claim 6, wherein said interpolating means determines a value of pixel data to be interpolated near a selected pixel based on a plurality of neighboring pixels neighboring the selected pixel.

8. An apparatus according to claim 1, further comprising a memory for storing the generated image data, wherein said memory has a least one of a receiving buffer area for storing the data sent from the data source and a preservation area for preserving a pattern sent from the data source.

9. An apparatus according to claim 8, wherein when said memory has said receiving buffer area and said preserving area, respectively, a size of the receiving buffer area or said preservation area, respectively, is variable.

10. An apparatus according to claim 1, wherein the data sent from the data source includes character code data, form information data and macro information.

11. A method that outputs image data to printing means for printing an image on a recording medium, said method comprising the steps of:

receiving data sent from a data source, the data including print data and designation data for designating a size of a recording medium on which an image is to printed;

determining a resolution in accordance with the designation data and an available memory capacity for storing image data; and generating, in accordance with the received print data, image data having the resolution determined in said determining step.

12. A method according to claim 11, wherein said determination step includes a comparison step of comparing a necessary memory capacity necessary for storing the designated size of image data having a first resolution with an available memory capacity for storing the generated image data.

13. A method according to claim 12, wherein, when the necessary capacity is larger than the available capacity, said determination step determines a second resolution smaller than the first resolution as the resolution in which image data is to be generated, and when the necessary capacity is not larger than the available capacity, said determination step determines the first resolution as the resolution in which image data is to be generated.

14. A method according to claim 12, further comprising a printing step of printing an image at the first resolution.

15. A method according to claim 14, wherein said printing step uses one of an electrophotographic printer and an ink jet printer.

16. A method according to claim 12, further comprising an interpolating step of interpolating the generated image data when the resolution of the generated image data is smaller than a predetermined resolution.

17. A method according to claim 16, wherein said interpolating step determines a value of pixel data to be interpolated near a selected pixel based on a plurality of neighboring pixels neighboring the selected pixel.

18. A method according to claim 11, further comprising a step of storing the generated image data in a memory, wherein the memory has at least one of a receiving buffer area for storing the data sent from the data source and a preservation area for preserving a pattern sent from the data source.

19. A method according to claim 18, wherein when the memory has the receiving buffer area or the preserving area, respectively, a size of the receiving buffer area or the preservation area, respectively, is variable.

20. A method according to claim 11, wherein the data sent from the data source includes character code data, form information data and macro information.

* * * * *

UNITED STATES PATENT AND TRADEMARK OFFICE
CERTIFICATE OF CORRECTION

PATENT NO. : 5,754,192
DATED : May 19, 1998
INVENTOR(S) : AKIO SUGAYA

It is certified that error appears in the above-identified patent and that said Letters Patent is hereby corrected as shown below:

ON THE TITLE PAGE

[56] References Cited

"3899298  9/1990 European Pat. Off. ..." should read
--389298  9/1990 European Pat. Off. ...--.

COLUMN 3 line 50, "transfer" should read --transfers--; and
line 63, "procedures" should read --procedure--.

COLUMN 5 line 42, "respectively," should read --, respectively,--.

COLUMN 7 line 13, "keep" should read --kept--;
line 18, "to" should read --to the--;
line 20, "is" should be deleted; and
line 53, "output-to" should read --output to--.

COLUMN 8 line 54, "a" should read --and a-- and "95," should read --95 corresponds to--.

UNITED STATES PATENT AND TRADEMARK OFFICE
CERTIFICATE OF CORRECTION

PATENT NO. : 5,754,192
DATED : May 19, 1998
INVENTOR(S) : AKIO SUGAYA

It is certified that error appears in the above-identified patent and that said Letters Patent is hereby corrected as shown below:

COLUMN 9 line 21,   "is" should read --is also--; and
   line 22,   "also to" should read --to--.

COLUMN 11 line 53,   "one of" should be deleted.
   line 63,   "has a" should read --has at--.

Signed and Sealed this

Twenty-eighth Day of September, 1999

Attest:

Q. TODD DICKINSON

*Attesting Officer*      *Acting Commissioner of Patents and Trademarks*